April 27, 1965     W. HAMILTON     3,180,302
HATCH COVER SYSTEM

Filed July 13, 1961                        4 Sheets-Sheet 1

INVENTOR.
WALLACE HAMILTON
BY David Young
ATTORNEY

April 27, 1965  W. HAMILTON  3,180,302
HATCH COVER SYSTEM
Filed July 13, 1961   4 Sheets-Sheet 2

INVENTOR.
WALLACE HAMILTON
BY David Young
ATTORNEY

INVENTOR.
WALLACE HAMILTON
BY David Young
ATTORNEY

INVENTOR.
WALLACE HAMILTON
BY David Young
ATTORNEY

United States Patent Office 3,180,302
Patented Apr. 27, 1965

3,180,302
HATCH COVER SYSTEM
Wallace Hamilton, Chagrin Falls, Ohio, assignor to PneumoDynamics Corporation, Cleveland, Ohio, a corporation of Delaware
Filed July 13, 1961, Ser. No. 123,785
5 Claims. (Cl. 114—203)

This invention relates generally to power operated hatch cover systems adapted to cover hatchways of ships and the like and more particularly to a new and improved fully powered hatch cover system including an inflatable seal and a power operated dogging mechanism wherein the entire system is operated from a single control.

It is an important object of this invention to provide a new and improved hatch cover system which includes an inflatable seal to prevent leakage between the hatch way and the hatch cover.

It is another important object of this invention to provide a water tight hatch cover of the type required on the weather deck of a ship which does not require jacking to release the seals.

It is still another object of this invention to provide a new and improved power operated dogging mechanism for use in conjunction with a power operated hatch cover.

It is still another object of this invention to provide a fully powered water tight hatch cover system incorporating an inflatable seal wherein the entire hatch cover system is operated from a single control.

It is still another object of this invention to provide a seal for hatch covers which is easily adjusted to compensate for variations in manufacturing tolerances.

Further objects and advantages will appear from the following description and drawings wherein.

Fluid tight hatch covers for use on the weather deck of ships have customarily been provided with a resilient seal which engages the hatchway or coaming. When such sealed systems incorporate several panels, it has been desirable to provide a jacking mechanism to vertically raise the panels prior to their movement to the open position to prevent wear of such seals caused by movement of seal along the hatchway. In the past it has also been customary to provide manually operated dogging systems to firmly lock the hatch cover panels in position when the cover is closed. A hatch cover system incorporating this invention utilizes power operated dogging mechanisms in combination with an inflatable seal arranged to eliminate the requirement of jacking. An automatic control system permits the operation of the entire hatch cover system from a single control and automatically sequences the various operational phases to prevent improper operation and any damage to the structure resulting therefrom.

Figure 1:
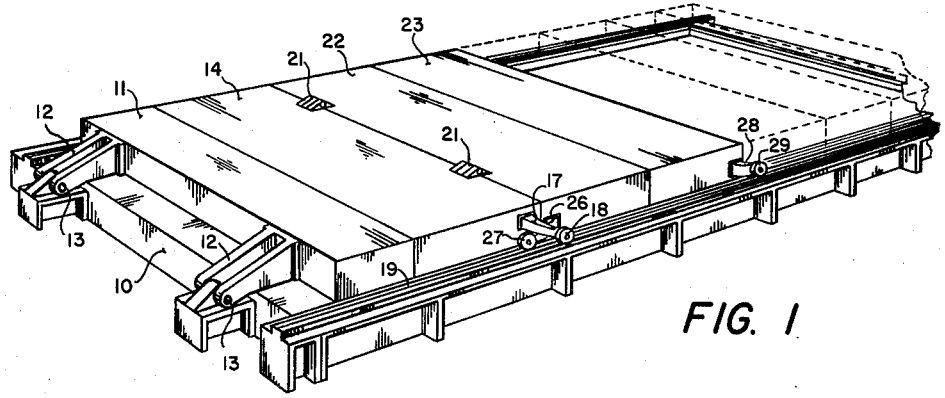
FIGURE 1 is a perspective view of a typical hatch cover incorporating this invention.

In FIGURE 1 a hatch cover incorporating this invention is illustrated. The hatch cover is mounted on the coaming 10 which extends around the hatchway of the ship. A first panel 11 is pivoted on the coaming 10 by a pair of hinges 12 for rotation about a pivot axis 13. A second panel 14 is pivoted on the first panel 11 by a hinge 16 illustrated in FIGURE 2 and is provided with roller support arms 17 and rollers 18 journaled thereon. A track 19 extends along each side of the hatchway to support the rollers 18 and in turn the associated panel during its movement between the folded and extended position. It should be understood that similar arms 17, rollers 18, and tracks 19 are provided on both sides of the cover and hatchway even though only one appears in FIGURES 1 and 2. Preferably, the arms 17 support the rollers 18 in a position beyond the end of the second panel 14 so that the initial folding movement of the first and second panels 11 and 14 about the hinge 16 results in substantially vertical movement of both panels. Metal support pads may be positioned along the coaming to engage and support the panels in the proper extended position.

Figure 2:
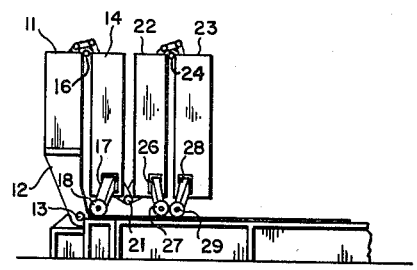
FIGURE 2 is a side elevation of the hatch cover system showing the panels in the open position clear of the hatchway.

A pair of hinges 21 pivotally connect the second panel 14 to a third panel 22 which is in turn pivotally connected to a fourth panel 23 by a hinge 24 illustrated in FIGURE 2. The four panels 11, 14, 22 and 23 cooperate to cover all or part of the hatchway when they are in their extended position shown in FIGURE 1 and fold clear of the hatchway when they are in the open position of FIGURE 2. If the hatchway is large, it may be necessary to provide additional pairs of panels or provide a similar assembly of panels which operate to fold to the other end of the hatchway. Generally, the number of panels used for a complete hatch cover system is determined by the size of the hatchway and the storage space available adjacent to the ends of the hatchway. It should be understood that even though the hatch cover system discussed in detail only includes four panels, systems having different numbers of panels can be provided.

A roller support arm 26 is mounted on each side of the third panel 22 and is provided with a roller 27 which engages the track 19. Similarly, support arms 28 and rollers 29 are mounted on the fourth panel 23. The support arms 17 and 26 are proportioned to bypass each other as the panels move to the extended position as illustrated in FIGURE 1 and the rollers 27 and 18 engage opposite sides of the track 19 to permit them to pass each other. If a similar assembly of panels is provided at the opposite end of the hatchway, its support arms corresponding to the arms 28 would be arranged to bypass the arms 28.

Figure 7:
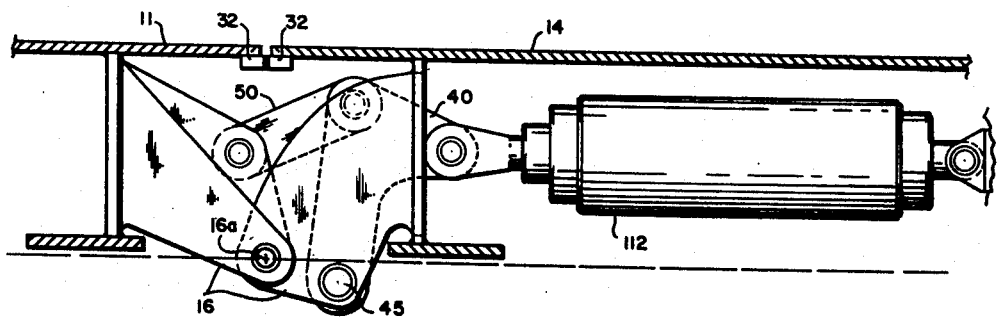
FIGURE 7 is a fragmentary of one type of panel actuator and linkage suitable for powering the panels.

Hydraulically operated actuation means illustrated in FIGURE 7 can be used to power the panels between the opened position of FIGURE 2 and the closed or extended position of FIGURE 1, however, other suitable systems and linkages could be used if desired. This system includes and actuator 112 connected to rotate a first link 40 around its pivot 45 on the panel 14. This operates to rotate the two panels 11 and 14 around the axis 16a of the hinge 16 through the action of a second link 50.

In order to provide a fluid tight joint between adjacent panels and between the panels and the coaming 10, an inflatable fluid seal 30 is provided. This seal extends along the bottom of each panel as illustrated at 31 in FIGURE 3 and laterally across the panels as indicated at 32. The bottom seal portion 31 engages the coaming and the lateral seal portion 32 engages a similar lateral portion on the adjacent panel to provide a seal between such adjacent panels. A first corner element 33 is positioned at the end of the bottom seal portion 31 and joins with the second corner element 34 which in turn connects to the lateral seal portion 32. The seal 30 extends around each of the panels and is continuous in that each panel is provided with a closed loop of sealing surface.

Figure 4:
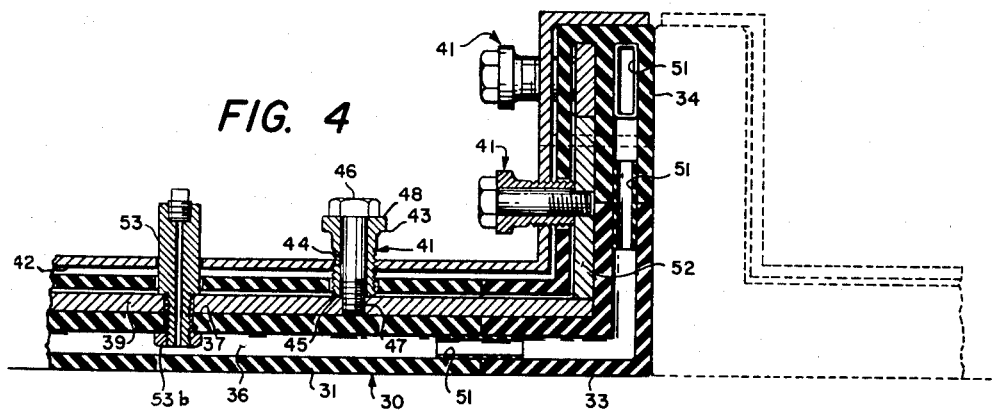
FIGURE 4 is an enlarged fragmentary view partially in longitudinal section illustrating the structural details of the seal and seal mounting.
Figure 5:
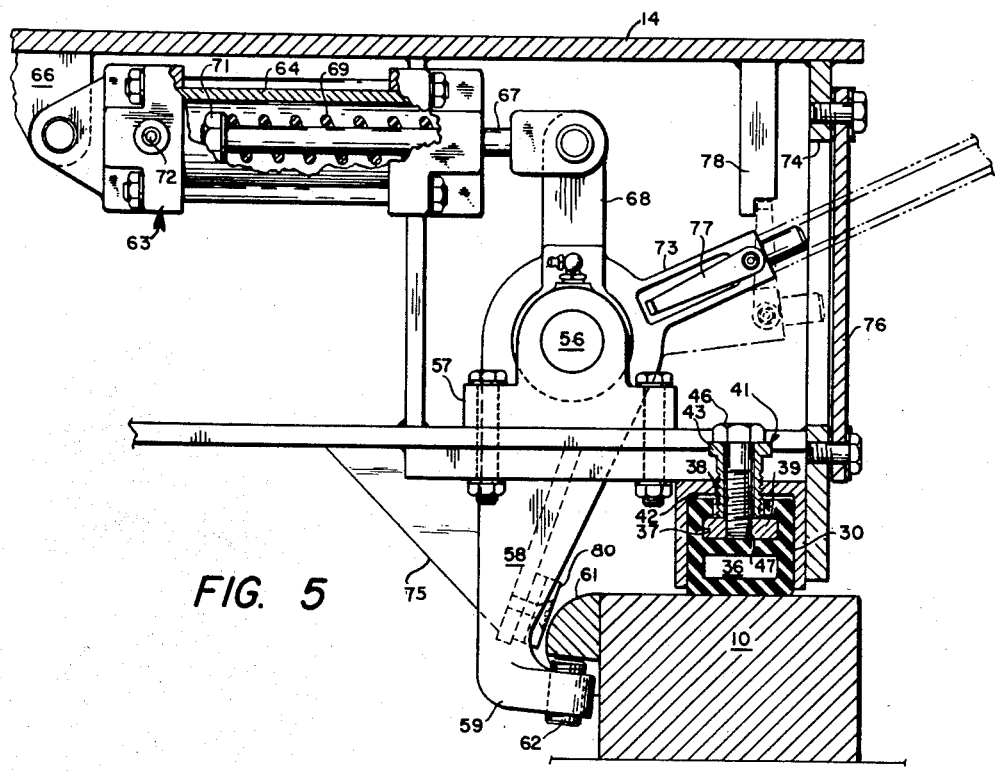
FIGURE 5 is a fragmentary section illustrating the seal structure and the power operated dogging mechanism.

Reference should now be made to FIGURES 4 and 5 which illustrate the structure of the seal and its support. The seal is preferably formed as an extrusion molded from a rubber like material such as neoprene having a durometer in the order of 55. The seal forming both the bottom portions 31 and the lateral portions 32 have a cross-section as illustrated in FIGURE 5 which includes an axial passage 36 adapted to receive compressed air when the seal is inflated and an upper channel 37 opens through a narrow throat 38. A support bar 39 of rectangular cross-section is positioned within the channel 37 and is supported by an adjustment assembly 41 within a U-shaped channel 42 formed on the panels to receive the seal. Preferably a plurality of adjustment assemblies 41 are positioned along the length of the support bars 39. The length of each support bar 39 and the spacing between the adjustment assemblies 41 depends upon the particular load requirements of the system. Each adjustment assembly includes a hollow bushing 43 formed with external threads threading into an aperture 44 in the top wall of the U-shaped channel 42. A bolt 46 extends through the bushing 43 and is threaded into an aperture 47 in the support bar 39. The bushing 43 is provided with an upper wall 48 engaged by the bolt head and a lower end 45 engaged by the support bar 39 when the bolt 46 is tightened.

To adjust the seal in the channel, it is merely necessary to loosen the bolt 46 and rotate the bushing 43 to thread it up or down and move the support bar relative to the channel. After the proper adjustment is reached, the bolt 46 is tightened, thus locking the system in the adjusted position. In this way the seal can be adjusted relative to the channel to compensate for any irregularities in the mating surface caused by manufacturing tolerances or the like and to insure that the seal is properly positioned to provide the proper sealing engagement between the seal and the mating surface.

The junction between the bottom portion 31 of the seal and the corner element 33 is provided by cementing a tubular insert 51 into the pressure passage 36 of the bottom portion 31 and corner portion 33. Preferably, the tubular insert has a lower durometer than the material forming the two sealing portions so that it will be urged into tight sealing engagement by the pressure of the air within the pressure passage 36. This provides a convenient and simple method of connecting the two elements so that a continuously fluid tight pressure passage is provided. A similar tubular insert 51 is provided at the joint between the two corner elements 33 and 34 and between the corner element 34 in the lateral portion 32 of the seal. Also, a vertical support bar 52 is used in the vertical section formed by the two corner elements 33 and 34. Here again, an adjustable assembly 41 is used to accurately position the support bar 51.

In order to prevent the cemented joint between the two corner elements 33 and 34 from being placed in tension, these elements are sized so that they are vertically compressed by the support bars. Therefore, if the corner end of the support bar 39 has to be adjusted down to provide correct positioning of the seal, such adjustment merely decreases the degree of vertical compression of the corner elements. Throughout the length of seal, the support bars 39 and 52 are not bonded to the walls of the channel 37 so that the seal can move along the support bars to properly position itself and relieve localized stresses.

An air fitting or tube 53 connects at one point to the pressure passage 36 on each panel. The tube is provided with a shoulder engaging the upper side of the support bar 39 and is threaded into a nut 53b in the pressure passage 36 to compress the seal around the tube and provide an air tight joint. The tube 53 is inturn connected to the control system and operates to permit air under pressure to be supplied to the pressure passage 36 when the seal is to be inflated and provides the exhaust passage to relieve the pressure when the seal is deflated.

The dogging assemblies located around the individual panels are of similar design so a discussion of a single assembly applies equally to all such assemblies. Referring to FIGURE 5, a pivot shaft 56 is journaled on bearings 57 on the panels which in the illustrated case is the panel 14. Mounted at spaced points along the pivot shaft 56 are dog members 58 formed with a lower hooked portion 59 which is proportioned to extend under a chafing bar 61 on the coaming, when the dog is in the hatch securing position. A self locking threaded stop member 62 extends through the hooked portion 59 and is provided with the desired amount of clearance between the dog assembly and the chafing bar 61. Preferably, the stop member is adjusted so that there is a clearance of approximately $\frac{1}{16}$ of an inch between its upper face and the lower side of the chafing bar 61. Each of the dog members 58 is keyed to the pivot shaft 56 so that rotation of the shaft from the full line position of FIGURE 5 in a clockwise direction causes the hooked portion 59 and the stop member 62 to move clear of the chafing bar 61, thus releasing the dogging assembly and permitting the hatch cover to move to the open position.

An actuator 63 is connected to rotate the pivot shaft and thereby operate the dogging assembly. The actuator includes a cylinder 64 pivoted on a bracket 66 on the panel 14 and a piston 67 pivotally connected to an arm 68 which is in turn keyed to the pivot shaft 56. A spring 69 extends between a nut 71 threaded onto the inner end of the piston 67 and the forward end of the cylinder 64 to resiliently urge the piston toward the retracted position and in turn resiliently maintain the dogging member 58 in the locked or dogged position. When fluid under pressure is admitted to the cylinder 64 through a port 72, it acts on the area of the piston 67 extending through hte forward gland to overcome the action of the spring 69 and move the dog members 58 clear of the chafing bar 61. Thus, hydraulic pressure operates to release the dogging mechanism and spring pressure automatically returns the dogging assembly to the locked position when the pressure is released.

To permit manual operation of the dogs to release them in the event of failure of hydraulic pressure, an arm 73 is mounted on the pivot shaft 56 adjacent to an access port 74. When such manual operation is necessary, a cover plate 76 is removed and a wrench is placed over the end of the arm 73 to permit manual rotation of the pivot shaft to release the dogging mechanism. To maintain the mechanism in the released position, a latch 77 mounted on the arm 73 is moved to a position wherein it engages a stop 78 on the panel 14.

Lateral position of the panels is maintained by rigid lateral stops 75 positioned around the panels. Each stop is provided with a stop block 80 adjacent the chafing bar 61 which can engage the chafing bar to prevent lateral displacement of the panels. The blocks 80 are mounted with spacers which can be changed to provide proper adjustment and are inclined relative to vertical so that they provide a camming action, if necessary, to properly position the panels. The lateral stops 75 therefore cooperated with the dogs to firmly lock the panels in position since the stops prevent lateral movement and the dogs prevent vertical movement.

When the seal is inflated by air under pressure within the pressure passage 36, it expands into sealing engagement with the coaming 10 and laterally expands the seals into tight sealing engagement with their confining channel. In some cases the vertical reaction of the seal will operate to raise the panels until the stop member 59 engages the chafing bar 61. Whether or not this occurs depends on the seal pressure, the weight of the panels and the weight of any cargo stored on the panels.

Figure 6:
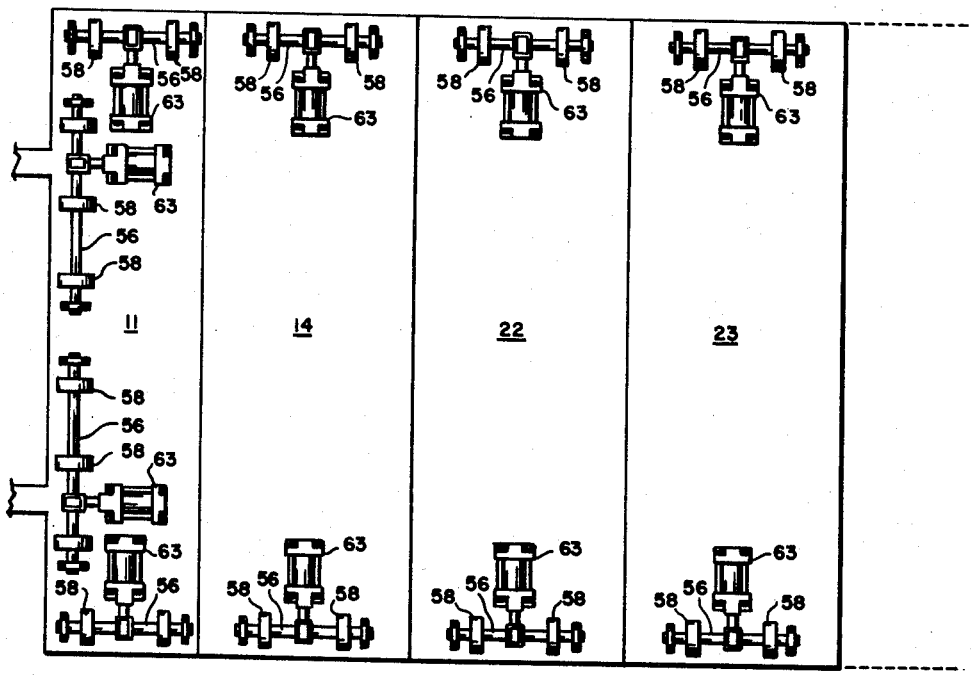
FIGURE 6 is a schematic plan view of the hatch cover illustrating the arrangement of the dogging mechanisms.

In FIGURE 6 a schematic illustration of the preferred dogging arrangement is illustrated. The panel 23 is provided with a dogging assembly on each end which includes two dog members 58 on each assembly. If the panels are longer, more dogging members would be used. Since the panels 14 and 22 are of similar size, they are each provided with two assemblies similar to the assemblies on the panel 23. It should be noted that the panel 11 has a seal extending not only along its ends but along the end of the hatchway, therefore, additional dogging assemblies are provided along the end of the hatchway portion of the panel. Each of these assemblies include three dogging members to provide the necessary strength.

Figure 8:
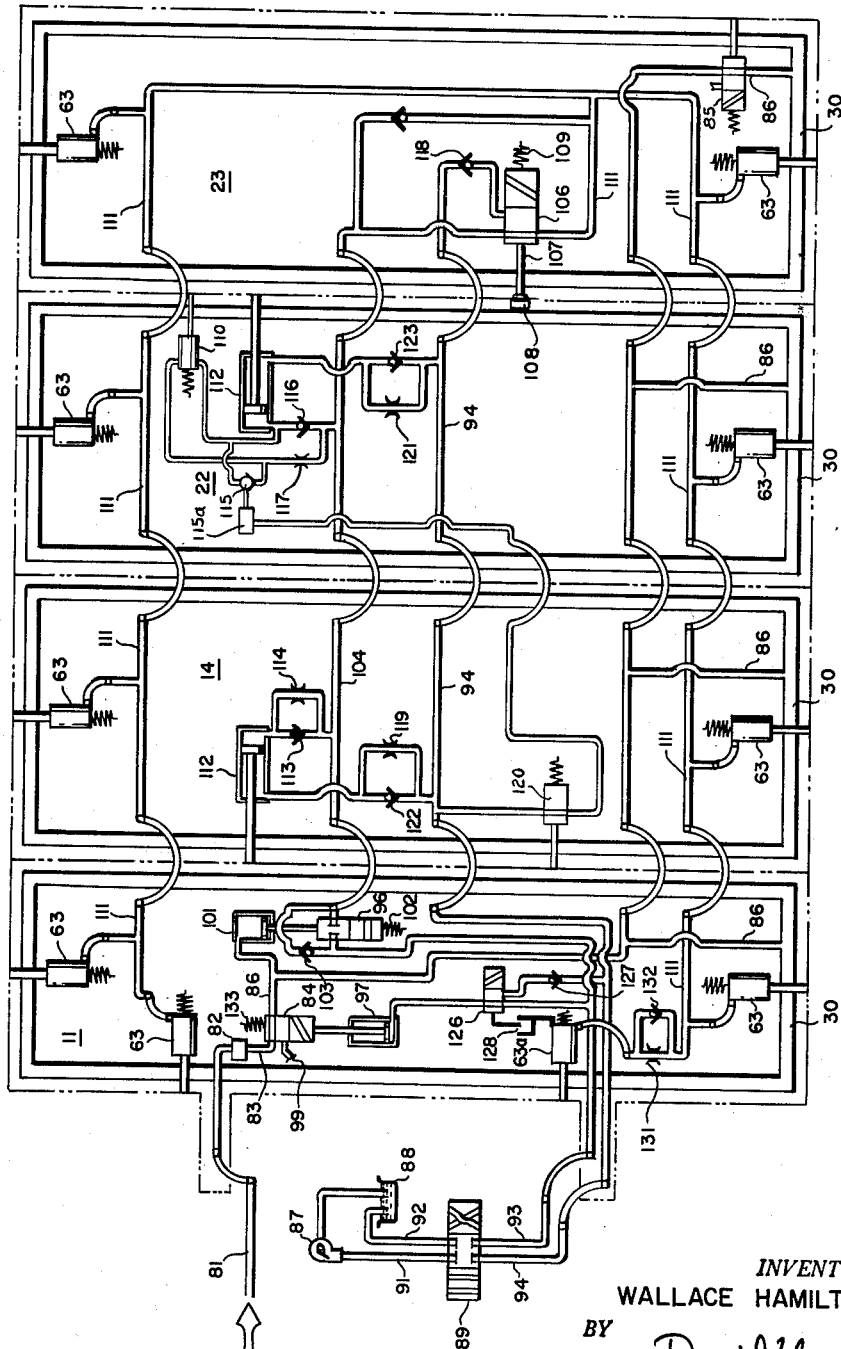
FIGURE 8 is a schematic illustration of the control system for operating the hatch cover system.

In the operation of the hatch cover, it is necessary, during the opening cycle, to first deflate the seals 30, thereafter release the dog members 58 and then operate the panel actuators 112. The sequence is reversed during the closing cycle in that the folding actuators first completely extend the panels, the dogging members 58 are then moved to the locked or dogged position and thereafter, the seals 30 are inflated. To accomplish the automatic sequencing in the required manner, an automatic control system illustrated schematically in FIGURE 8 is provided. Air under pressure is supplied from the shipboard pressure line through a connecting line 81 to a pressure regulator 82 which reduces the supply pressure to the required 20 pounds per square inch. From the pressure regulator 82 the air is supplied through a pressure line 83 to a normally open air control valve 84. The outlet port of the control valve 84 is connected to each of the seals 30 through pressure lines 86 so that the seals are normally inflated with an air pressure equal to the pressure supplied from the pressure regulator 82.

When the hatch cover system includes a second system with a panel which abuts the panel 23, a valve 85 is used in the line to the seal 30 of the panel 23. This valve functions to exhaust the seal 30 on the panel 23 whenever the abutting panel moves away to prevent the seal from being blown out. When the abutting panel moves into the adjacent position, it engages the operator of the valve 85 and shifts the valve permitting the associated seal to be pressurized.

The hydraulic pressure to operate the dogging mechanism and the hatch cover actuators can be supplied from the ships hydraulic pressure system or from a separate pressure source schematically illustrated as a pump 87 and a reservoir 88. The output of the pump 87 is connected to a four-way control valve 89 through a pressure line 91 and the reservoir 88 is connected to the four-way valve 89 through a reservoir return line 92.

The output or controlled ports of the four-way valve 89 are connected to pressure lines 93 and 94. The pressure line 93 is connected to a sequence valve 96 and to hydraulic valve operator 97 connected to the air control valve 84 through a sequence valve 126. When the pressure line 93 is pressurized by the control valve 89, the valve operator 97 shifts the air control valve 84. In this position of the air control valve 84, the pressure line 86 is connected to an exhaust 99 and isolated from the supply pressure line 83. This operates to deflate the seals.

The pressure line 86 is connected to a pneumatic valve operator 101 which shifts the sequence valve 96 to the closed position against the action of the spring 102 whenever the seals are pressurized. The spring 102 is sized to move the sequence valve 96 to the open position when the air pressure within the pressure line 86 drops below a pressure in the order of five pounds per square inch. Thus, the sequence valve 96 remains closed and prevents the hydraulic pressure in the line 93 from passing to the remaining portions of the system when the seals are inflated, but automatically permits the sequence valve to open when the seals are deflated. A pressure line 104 is connected to the line 93 when sequence valve 96 opens and to a normally open mechanically operated sequence valve 106.

The valve 106 mounted on the panel 23 is provided with an operator 107 which engages a stop 108 on the panel 22 when the panels 22 and 23 are in their extended position that operates to overcome the action of the spring 109 and connect the pressure line 104 to a pressure distribution line 111. This line 111 connects to each of the dogging actuators 63. Thus, pressurization of the pressure line 93 operates after the seals are deflated to operate each of the dogging actuators 63 if the panels are in the extended or closed position.

The pressure line 104 is also connected to the panel folding actuators 112 to cause extension of the actuators 112 and folding movement of the panels when the pressure line 104 is pressurized. A plurality of similar parallel connected actuators 112 are provided along the hinge lines between the panels 11 and 14 and also between the panels 22 and 23. These actuators are sized to provide the necessary force to fold the panels when the pressure in the order of a thousand pounds is reached. The dogging actuators 63, however, are sized to operate at a pressure in the order of one hundred pounds per square inch. Therefore, the dogging actuators 63 operate to release the dogs and bottom out before sufficient pressure builds up to operate the panel actuators 112. This provides automatic sequencing of the dogging and panel folding operations. The panel actuators 112 which operate to fold the panels 11 and 14 are connected through a check valve 113 and a bypass metering orifice 114 to the pressure line 104. Similarly, the panel actuators 112 which operate to fold the panels 22 and 23 are connected to the pressure line 104 through a check valve 116 and a bypass orifice 117. The two check valves 113 and 116 are arranged to bypass their associated orifices 114 and 117 during the opening cycle of the panels but to require the exhaust flow through their associated orifices when the panels are closing. Therefore the orifices 114 and 117 regulate the speed of closing of the panels by controlling the exhaust flow therefrom.

As soon as the panels 23 and 22 begin to open the sequence valve 106 shifts to the left under the influence of the spring 109 isolating the pressure line 111 from the pressure line 104. This operates by virtue of a check valve 118 to hydraulically lock the dogs in the released position. During the opening movement of the panels the forward end of each of the actuators 112 is connected to the pressure line 94 through a bypass orifice 119 in the case of the actuators 112 powering the panels 11 and 14 and a bypass orifice 121 in the case of the actuators 112 power and panels 22 and 23. These orifices control the rate of open movement by throttling the exhaust from the actuators 112.

To close the panels it is necessary to shift the four-way control valve 89 to the right and pressurize the pressure line 94 while connecting the pressure line 93 to reservoir return. The pressure line 94 is connected at this time to the forward end of the actuators 112 through a bypass check valve 122 bypassing the orifice 119 and a bypass check valve 123 bypassing the orifice 121. The pressure line 94 is also connected to the dogging actuator distribution line 111 through the sequence valve 106 since the sequence valve 106 is shifted to the left at this time. The check valve 118 permits flow to the dogging actuator 63 through the sequence valve 106 to insure that the dogging actuators 63 are operated to move the dog members to the release or undogged position. This insures proper operation even if the dogging actuators have leaked to permit the dogs to move to the locked position while the hatch cover remains in the open position.

The pressure line 94 is connected to the hydraulic valve operator 97 through a check valve 127 and a mechanically operated sequence valve 126. The sequence valve 126 is connected to be operated by a lost motion device illustrated schematically at 128 which connects the valve to one of the dog actuators 63a. This connection operates to shift the sequence valve 126 to the left when the dogging actuators are pressurized to provide a connection between the pressure line 94 and the valve operator 97. The check valve 127 permits flow to the valve operator 97 when the pressure line 94 is pressurized so the air control valve 84 is moved to the exhaust position against the action of a spring 128. This insures that the seals are deflated and the dogging actuators 63 are pressurized at the time the panel actuators 112 operate to move the panel to the extended position.

When there are four or more panels in the hatch cover system, the outer panels should be extended a substantial amount before the panels 11 and 14 extend so that the rollers 27 and 29 move apart to provide stability. However, it is important that the panels 11 and 14 reach the fully extended position before the panels 22 and 23. This sequencing is provided by a valve 110 and hydraulically operated check valve 115. The valve 110 and check valve 115 are connected in parallel with each other and in series with the orifice 117. The check valve 115 is normally closed and is adapted to be opened when hydraulic pressure is supplied to an operator 115a by a normally closed sequencing valve 120. The valve 110 is normally open and is provided with an operator which engages the panel 23 when the panels 22 and 23 reach a predetermined position approaching the extended or closed position and shifts the valve 110 to the closed position.

During the closing cycle the panels 22 and 23 move faster than the panels 11 and 14. To insure this operation, the orifice 114 is sized to provide a greater flow resistance than the orifice 117. When the panels 22 and 23 reach a predetermined partially extended position, the valve 110 is closed. This blocks the exhaust from the actuator 112 and stops further extension. The panels 11 and 14 continue to extend until they reach the closed position. When this occurs, the normally closed valve 120 is opened by engagement between its operator and the panel 11. This connects the operator 115a to the pressure line 94 and opens the check valve 115. This, in turn, bypasses the valve 110 and permits the panels 22 and 23 to fully extend.

When the extended position is reached, the valve operator 107 engages the stop 108 and shifts the mechanically operated sequence valve 106 to the position illustrated in FIGURE 8 at which time the dogging actuators are connected to exhaust through the pressure line 104 and 93. The springs associated with each of the dogging actuators therefore moves the dog members to the locked position. A metering orifice 131 is connected in the exhaust of one of the dogging actuators 63a to insure that it moves to the locked position under the influence of this spring at a rate slower than the remaining dogging actuator 63. During pressurization of this actuator, however, a check valve 132 operates to bypass the orifice 131. The use of the metering orifice insures that all of the dogs are in the locked or dogging position before the actuator 63a. When the dogging actuator 63a moves under the influence of its spring, it operates the sequencing valve 126 through the lost motion connection 128 to shift the valve to the position shown in FIGURE 8 at which time the valve operator 97 is connected to exhaust through the line 93. This permits the spring 133 to shift the air control valve 84 back to its open position thus pressurizing the seals 30. This of course, operates to shift the sequence valve 96 through the action of the valve operator 101. The back check valve 103 operates to prevent pressures from occurring in pressure line 104 due to thermal expansion of the liquid or any other source such as valve leakage.

In operation, movement of the four-way valve 89 to the left pressurizes the line 93 which operates by means of the valve operator 97 to exhaust the seals by shifting the seal control valve 84 against the spring 133. When the pressure within the seals drops to a predetermined pressure that insures substantial deflation of the seals, the sequence valve 96 operates to connect the pressure line to the line 104. This causes fluid under pressure to be supplied to all of the dogging actuators 63. Since these actuators operate with a pressure in the order of 100 pounds they release the dogs before the panel actuators operate. The seals are deflated at this time so there is clearance and the dogs freely move to the open position. Movement of the dog actuator 63a does not result in a return of the air control valve 84 to its open position since the check valve 127 prevents the exhaust of the valve operator 97. After the dogging actuators 63 bottom out, the pressure in the line 104 builds up to a level in the order of 1000 pounds which is sufficient to operate the panel actuators 112 to fold the hatch cover.

During the closing sequence of the operation, the four-way control valve 89 is shifted to the right. This pressurizes the line 94 and connects the line 93 to reservoir return. At this time the mechanically operated sequence valve 106 is in its left position so fluid under pressure is supplied to all of the dogging actuators. This insures that the sequence valve 126 remains in its left position and the valve operator 97 is pressurized so that the air control valve 84 exhausts the seal. When the actuators 112 complete the closing operation of panels, the sequence valve 106 is shifted to exhaust the dogging actuators 63. The sequencing valves 110 and 120 insure that the panels 11 and 14 close before the panels 22 and 23 while also insuring that the panels 22 and 23 start to extend immediately.

The connection of the dogging actuators to exhaust results in their being moved by their respective springs to the dogged or locked position and the operation of the orifice 131 insures that the dogging actuator 63a is the last to reach its dogged position. This movement of the dogging actuator 63a to its dogged position operates to shift the sequence valve 126 to connect the valve operator 97 to exhaust through the pressure line 93. As a result, the air control valve is re-opened and the seals are pressurized, thus, completing the entire sequence of operations.

The seals may be arranged so that a slight amount of interference is provided between the deflated seal and the mating elements when the panels are in their extended or closed position to provide a fluid tight joint in the event that air pressure is lost. This amount of interference, however, does not result in damage to the seals when the covers are operated.

Figure 3:
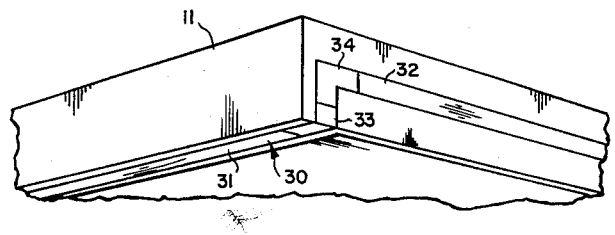
FIGURE 3 is a fragmentary perspective view of the corner of one of the hatch cover panels illustrating the arrangement of the inflatable seal.

The lateral portions 32 of the seal which extend along the joint between the panels 11 and 14 and between the panels 22 and 23 should be arranged above the operating linkage actuated by the panel actuators 112 as indicated schematically in FIGURE 7. However, the lateral portions of the seal along the hinge line between the panels 14 and 22 should be spaced from the upper surface as illustrated in FIGURE 3.

Those skilled in the art will recognize that a hatch cover system incorporating this invention provides the high degree of reliability necessary for such shipboard applications and simplified controls which insure the proper operation of the system. The use of power to operate all of the components of the hatch covers increases the speed of operation, thus providing substantial savings in both time and manpower.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A power operated hatch cover system comprising
a plurality of panels movable between an extended position in which the panels cover a hatchway to a folded position clear of said hatchway.
inflatable means operable to provide a fluid tight seal between adjacent ones of the panels as well as between said panels and the hatchway and to support said panels from the hatchway when the inflatable means is inflated,
said inflatable means being disposed along the peripheral sides and end portions of each of the panels with each of the inflatable means having a passageway extending generally longitudinally therethrough,
elements interconnecting the passageways of the inflatable means of each panel to define a continuous conduit therethrough,
dogging mechanism cooperable with said inflatable means and normally maintained in a dogged position when said panels are in the extended position with the panels being mechanically locked relative to said hatchway in response to the inflation of said inflatable means,
said dogging mechanism comprising a stop face carried by each of the panels and stop faces carried by the hatchway with each of the stop faces of the hatchway being disposed in generally vertically spaced relationship relative to a respective one of the stop faces carried by the panels when the inflatable means is deflated and in engagement with each other when the inflatable means is inflated,
first power means connected to release said dogging mechanism,
second power means connected to move said panels between said folded and said extended positions, and
a control system connected to said inflatable means and both of the power means automatically operable upon movement of a switching device to a first condition to deflate said inflatable means, thereafter releasing said dogging mechanism and enabling said panels to be moved to said folded position, and operable under the influence of movement of said switching device to a second condition to urge said panels to said extended position with said inflatable means being deflated and said dogging mechanism released, thereafter permitting said dogging mechanism to move to said dogged position with the inflatable means being inflated to effect the mechanical locking of said panels relative to said hatchway.

2. A hatch cover system comprising
a plurality of panels movable between an extended position in which the panels cover a hatchway and a forward position clear of said hatchway,
power operated panel actuators connected to move said panels between said extended and said folded positions,
inflatable means operable when pressurized to provide fluid tight sealing engagement between adjacent ones of the panels and between said panels as well as the hatchway, and when deflated to release said fluid tight sealing engagement,
said inflatable means being disposed along the peripheral sides and end portions of each of the panels with each of the inflatable means having a passageway extending generally longitudinally therethrough,
elements interconnecting the passageways of the inflatable means of each panel to define a continuous conduit therethrough,
power operated dogging means operable between a locked position in which said panels are mechanically locked in said extended position and a released position wherein said panels are free to move between said extended and said folded positions,
said dogging means comprising a stop face carried by each of the panels and stop faces carried by the hatchway with each of the stop faces of the hatchway being disposed in generally vertically spaced relationship relative to a respective one of the stop faces carried by the panels when the inflatable means is deflated and in engagement with each other when the inflatable means is inflated, and
automatic controls interconnecting said panel actuators, said seal means and the dogging means operable to prevent movement of said dogging means to said released position until said inflatable means is deflated and to maintain said dogging means in said released position except when said panels are in said extended position.

3. In combination with a hatchway having a hatch cover system comprising an arrangement of a plurality of panels movable between a folded position clear of the hatchway to a closed position in which the panels cooperate to cover the hatchway,
apparatus for creating a fluid tight seal between adjacent ones of the panels as well as between the panels and the hatchway when the arrangement of the panels is in the closed position while preventing movement of the panels from the closed position to a folded position,
said apparatus comprising
inflatable means disposed along the peripheral sides and end portions of each of the panels with each of the inflatable means having a passageway extending generally longitudinally therethrough,
elements interconnecting the passageways of the inflatable means of each panel to define a continuous conduit therethrough,
said inflatable means being operable on inflation thereof to create the fluid tight seal with the inflatable means that is disposed on the end portions of adjacent ones of the panels being in engagement with each other and with the inflatable means disposed along the side portions of each panel engaging the hatchway,
structure responsive to the inflation of the inflatable means for locking the panels of the arrangement in the closed position and against movement relative to said hatchway,
said structure further being responsive to the deflation of the inflatable means to unlock the panels of the arrangement and enable the panels to be movable between the closed and folded positions,
said structure comprising dogging mechanism defined by a plurality of pairs of stop faces with each pair of stop faces having one stop face carried by the hatchway and another stop face carried by the panels with each pair of stop faces being disposed in generally vertically spaced relationship relative to each other when the inflatable means is deflated and in engagement with each other when said inflatable means is inflated, and
control means for inflating and deflating the inflatable means from a source of fluid under pressure.

4. Apparatus for positioning, in fluid tight sealing relationship relative to a hatchway, an arrangement having at least one panel, said apparatus comprising
inflatable means disposed along the peripheral sides and end portions of the panel which may engage the hatchway or another panel that may be disposed adjacent thereto for creating a seal therebetween on inflation of the inflatable means,
each of said inflatable means having a passageway extending generally longitudinally therethrough,
elements interconnecting the passageways of the inflatable means to define a continuous conduit,
structure for releasably locking said panel against movement relative to the hatchway on inflation of the inflatable means and for enabling said panel to be movable relative to the hatchway on deflation of the inflatable means, said structure comprising dogging mechanism defined by a stop face carried by the hatchway and a stop face carried by the panel with said stop faces being disposed in generally vertically spaced relationship relative to each other when said inflatable means is deflated and in engagement with each other when said inflatable means is inflated, fluid under pressure for inflating said inflatable means to create the seal and for locking the structure to prevent movement of the panel relative to the hatchway, and a control system connected to the inflatable means and the structure for enabling the fluid under pressure to deflate the inflatable means and thereafter release said structure to enable the panel to be moved relative to the hatchway, and for inflating the inflatable means to lock said structure and prevent movement of the panel relative to the hatchway while also effecting the seal therebetween.

5. The apparatus as set forth in claim 4 wherein the stop face carried by the panel is pivotally mounted thereto and is provided with an adjustment for varying the generally vertical space between the stop faces of the structure when the inflatable means is deflated.

References Cited by the Examiner

UNITED STATES PATENTS

| 2,008,741 | 7/35 | Allan | 189—1 |
|---|---|---|---|
| 2,088,909 | 8/37 | Jaubert | 114—117 X |
| 2,184,057 | 12/39 | Parker | 60—97 |
| 2,361,298 | 10/44 | Laddon | 114—301 X |
| 2,633,613 | 4/53 | MacGregor | 20—69 |
| 2,665,459 | 1/54 | Lee | 20—69 |
| 2,707,928 | 5/55 | Farrell | 114—203 |
| 2,753,827 | 7/56 | Sabin | 114—201 |
| 2,843,422 | 7/58 | Black. | |
| 2,857,874 | 10/58 | McBride | 114—202 |
| 2,945,467 | 7/60 | Wigeland | 114—201 |
| 3,039,527 | 6/62 | Senior | 160—188 |
| 3,104,643 | 9/63 | Vallet | 114—202 |

FOREIGN PATENTS 96,612   8/60   Norway.

MILTON BUCHLER, Primary Examiner.

ANDREW H. FARRELL, Examiner.